Figure 1:
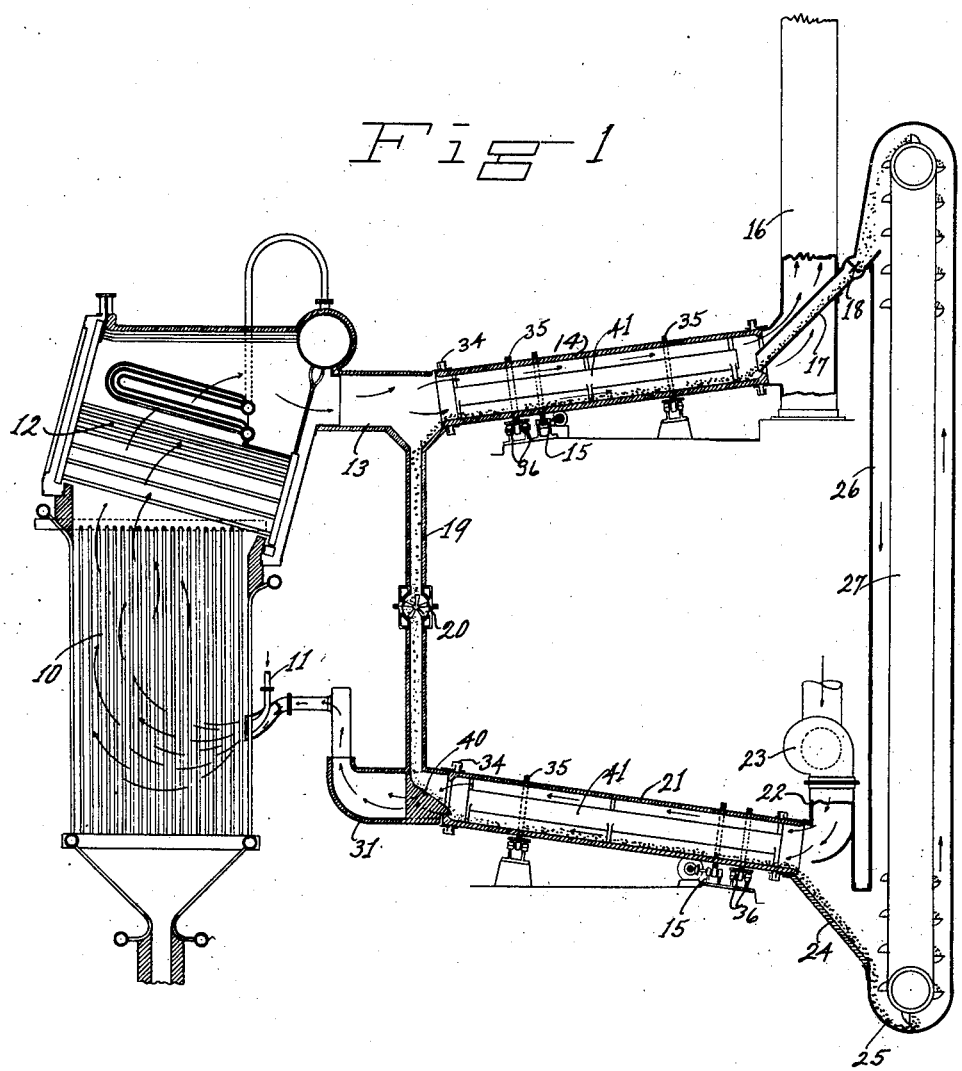

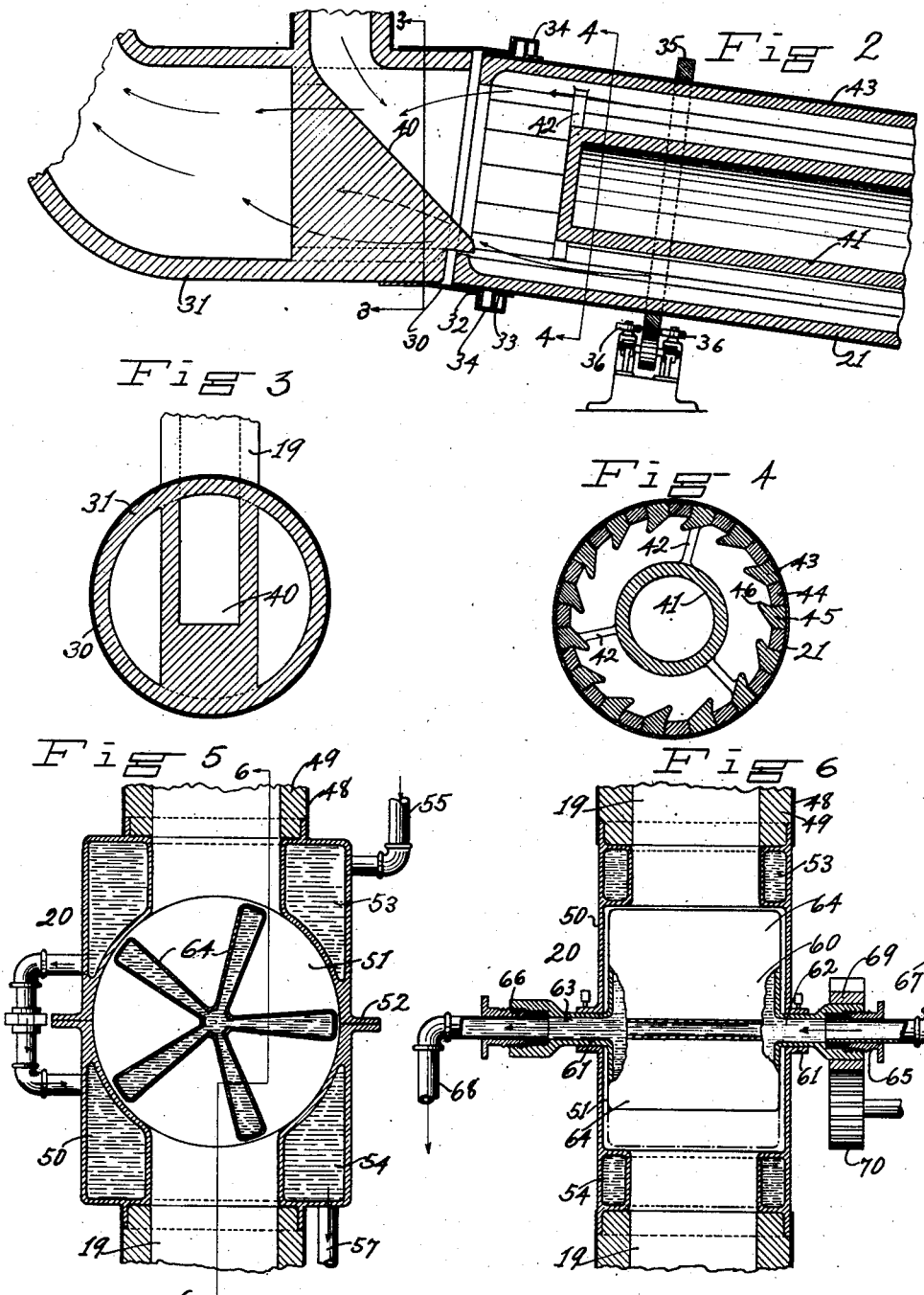

Patented Apr. 18, 1933

1,904,153

UNITED STATES PATENT OFFICE

CHARLES E. LUCKE, OF NEW YORK, N. Y., ASSIGNOR, BY MESNE ASSIGNMENTS, TO FULLER LEHIGH COMPANY, A CORPORATION OF DELAWARE

HEATING COMBUSTION AIR FOR A FURNACE

Application filed March 26, 1927, Serial No. 178,565. Renewed February 1, 1932.

This invention relates to the heating of combustion air for a furnace to a temperature above the ignition temperature of the fuel that is introduced into the furnace. In the particular embodiment of the invention described in this application, the combustion air is heated by means of a rotary regenerative air heater and the furnace is shown in connection with a steam boiler, but it is to be understood that the invention is not restricted to the specific details or the specific connection with which it is described.

The invention will be understood from the description in connection with the accompanying drawings, in which Fig. 1 is a vertical section through an illustrative embodiment of the invention; Fig. 2 is a longitudinal section through one of the details, on an enlarged scale; Fig. 3 is a section along the line 3—3 of Fig. 2; Fig. 4 is a section along the line 4—4 of Fig. 2; Fig. 5 is a vertical section, on an enlarged scale, showing another detail, and Fig. 6 is a section along the line 6—6 of Fig. 5.

In the drawings, reference character 10 indicates a furnace that is provided with water wall tubes of the well known type that may be connected to the circulation system of a boiler that is located above the furnace. A fuel inlet 11 is located at the side of the furnace through which powdered fuel, gas, oil or other fuel may be introduced. A boiler 12 of the Babcock & Wilcox type is shown as located above the furnace, from which boiler an outlet 13 for waste gases leads.

A rotary cylinder 14 inclined upwardly from the outlet 13 is mounted so as to be rotated by any convenient mechanism, as indicated somewhat diagrammatically at 15 in Fig. 1. The upper end of the rotary cylinder 14 is connected to a stack 16, and a chute 17 provided with a rotary valve 18, leads to the upper end of the rotary cylinder 14.

A conduit 19 leads from the outlet 13, near where it is connected to the cylinder 14, to a point near where another rotary cylinder is connected to the air inlet for the furnace. The conduit 19 is provided with a gas seal 20 to be described more in detail below. A rotary cylinder 21 similar to the cylinder 14 and driven in a similar manner is located at the lower end of the conduit 19 and is inclined in the opposite direction to the inclination of the cylinder 14. The outlet 22 from the forced draft fan 23 leads into the lower end of the inclined cylinder 21 and an incline 24 leads from the lower end of the cylinder into the lower end 25 of a passageway or housing 26 for a conveyor 27 preferably of the bucket type.

Gas-tight seals are provided between the ends of the rotary cylinders 14 and 21 and the stationary parts of the apparatus. For example, a metal gas seal 30 (Fig. 2) is connected to the conduit 31 at the lower end of the conduit 19 and is provided with a flange 32 around the end that surrounds the end of the rotary cylinder 21. A flange 33 is attached to the cylinder 21 near the end thereof and a cover 34 that is channel-shape encloses the flanges 32 and 33. The width of the cover 34 is somewhat greater than the distance between the flanges 32 and 33 so as to provide for expansion and contraction and still maintain a substantially gas-tight joint. The other ends of the cylinders 14 and 21 are provided with similar gas seals and these cylinders are provided with rings 35 on the outside thereof, which rest upon rollers, and guide rollers 36 are provided to bear against the opposite sides of the rings 35 so as to keep the cylinders in place.

The lower end of the conduit 19 communicates with a port 40, with a sloping bottom portion located in the air conduit 31, through which port material may be discharged into the lower cylinder 21. The cylinders 14 and 21 are each provided with a central cylinder 41 that is connected to the inside of the rotary cylinders by means of spokes 42. The cylinders 14 and 21 may consist of an outside shell 43 of metal that is lined with longitudinal rows of tile 44 and 45, the tile 45 being provided with extending ribs 46 for picking up material as the cylinders rotate, and the cylinders 41 may be made entirely of refractory material.

The conduit 19 is provided with an outer metal casing 48 and is lined with refractory material 49 (Figs. 5 and 6). A metal casing 50 is interposed in the conduit 19 for accommodating the gas seal 20. The metal casing 50 is provided with a central cylindrical space 51 whose axis is horizontal and comprises two sections that are connected by flanges 52. The two sections contain spaces 53 and 54 through which cooling fluid may be caused to pass. An inlet pipe 55 for the fluid is connected to the space 53 and a pipe 56 connects the space 53 to the space 54, from which an outlet pipe 57 leads.

A gas seal in the form of a revoluble valve 60 is located in the space 51 and mounted in bearings 61 in the casing 50. The valve 60 is provided with hollow trunnions 62 and 63 that extend through the bearings 61, and also with radially extending hollow members 64 whose interior spaces are in communication with the hollow trunnions 62 and 63. Stuffing boxes 65 and 66 are provided to connect the trunnions 62 and 63 with the stationary inlet pipe 67 and outlet pipe 68, respectively. A pinion 69 is provided on the trunnion 62 and is driven by the gear 70 from any convenient source of power.

The operation is as follows: Fuel is admitted through the fuel burner 11 into the furnace 10 and the hot products of combustion rise and, after passing over the heating surfaces of the boiler 12, the waste products pass out through the outlet 13 into the cylinder 14, that is kept rotating, and thence into the stack 16. At the same time, particles of solid material, preferably of a refractory nature, are lifted by the conveyor 27 and, after passing by the valve 18 which prevents waste products of combustion from leaking past, the particles of solid matter pass through the chute 17 into the upper end of the cylinder 14 and are tumbled as the cylinder rotates, gradually passing downwardly across the stream of waste products of combustion in counter-current direction thereto, becoming heated. The particles of solid material then pass through the conduit 19 and gas seal 20 into the upper end of the rotary cylinder 21, where the heat that was stored in these particles is absorbed by the incoming air from the fan 23 as these particles are tumbled and are gradually moved downwardly in countercurrent direction to the stream of air that is entering the cylinder 21. The particles having been cooled, pass out of the cylinder 21 along the sloping surface 24 into the space 25, from which they are lifted by the conveyor 27 and again pass through the stream of waste products of combustion. The air passing from the fan 23 through the cylinder 21 and becoming heated therein to a temperature above the ignition temperature of the fuel that is being used passes along the outside walls of the port 40 into the air inlet 31, thence through the air inlet 31 into the furnace, where the fuel burner 11 is located.

The gas seal 20 not only prevents the mixing of the combustion air and the waste products of combustion, but feed water may be circulated through this gas seal and the spaces therearound through the connections, as indicated in Figs. 5 and 6, thus imparting heat from the hot particles to the feed water for the boiler. The length and inclination of the cylinders may be made suitable for particular conditions of operation and they may be rotated at different speeds in accordance with the length of time it is desired to subject the solid particles to the waste products of combustion and to the combustion air, respectively.

This invention may be used to heat combustion air either below the ignition temperature of the fuel or up to or above this temperature. If the temperatures in the cylinders are sufficiently low, they may be made entirely of metal, or the refractory linings may be omitted. When the temperature of the combustion air is increased above the ignition temperature of the fuel, several advantages will be obtained, among which are: The fuel, when powdered, will undergo practically instantaneous combustion when it enters the furnace, so that the size of the furnace may be smaller than would otherwise be required; it is not necessary to pulverize fuel to the same degree of fineness that is ordinarily required; and in view of the fact that higher temperatures are obtainable for the gases that pass over the boiler heating surfaces, the amount of the boiler heating surfaces can be decreased without loss of efficiency. In many instances, it would be found advisable to heat the combustion air somewhat above the ignition temperature of the fuel, so that when the air and fuel are mixed, the temperature of the mixture will be at least sufficient to satisfy the sensible heat requirements, and possible latent heat requirements of the liquid vaporizable constituents of the fuel that must be brought to the ignition temperature without lowering the temperature of the mixture below the ignition temperature.

I claim:

1. The process which comprises introducing a stream of fuel into a furnace, heating a stream of solid particles of refractory material to a temperature in excess of the ignition temperature of said fuel by contacting them directly with hot products of combustion leaving said furnace, continuously heating a stream of air in a sufficient amount and to a temperature sufficiently in excess of the ignition temperature of said fuel to cause a mixture of said air and fuel to be at a temperature in excess of the ignition temperature of said fuel by contacting said stream of air directly with said hot solid particles after removing them from the zone where they were heated, and continuously introducing a stream of said highly heated air together with said stream of fuel into said furnace at a temperature at least as high as the ignition temperature of said fuel.

2. The process which comprises introducing a stream of cold fuel into a furnace, continuously heating a stream of air in contact with segregated moving hot solids by utilizing hot products of combustion leaving said furnace for first heating said hot solids, said air being thereby heated in a sufficient amount and to a temperature sufficiently in excess of the ignition temperature of said fuel to cause a mixture of said hot air and cold fuel to be at a temperature in excess of the ignition temperature of said fuel, and continuously introducing said stream of said highly heated air together with said stream of cold fuel into said furnace, thus causing said streams to rise to a temperature at least as high as the ignition temperature of said fuel.

CHARLES E. LUCKE.